(12) United States Patent
Danelon et al.

(10) Patent No.: US 10,254,623 B2
(45) Date of Patent: Apr. 9, 2019

(54) MACH-ZEHNDER (MZ) RING OPTICAL MODULATOR

(71) Applicant: STMicroelectronics SA, Montrouge (FR)

(72) Inventors: Valerie Danelon, Grenoble (FR); Denis Pache, Grenoble (FR); Christophe Arricastres, Grenoble (FR)

(73) Assignee: STMicroelectronics SA, Montrouge (FR)

( * ) Notice: Subject to any disclaimer, the term of this patent is extended or adjusted under 35 U.S.C. 154(b) by 0 days.

(21) Appl. No.: 15/679,691

(22) Filed: Aug. 17, 2017

(65) Prior Publication Data

US 2018/0246389 A1    Aug. 30, 2018

(30) Foreign Application Priority Data

Feb. 24, 2017 (FR) .................................... 17 51502

(51) Int. Cl.
*G02F 1/225* (2006.01)
*G02B 6/293* (2006.01)
*G02F 1/025* (2006.01)
*G02F 1/21* (2006.01)

(52) U.S. Cl.
CPC ......... *G02F 1/225* (2013.01); *G02B 6/29338* (2013.01); *G02F 1/025* (2013.01); *G02F 1/2257* (2013.01); *G02F 2001/212* (2013.01); *G02F 2203/15* (2013.01)

(58) Field of Classification Search
None
See application file for complete search history.

(56) References Cited

U.S. PATENT DOCUMENTS

2016/0103382 A1    4/2016  Liboiron-Ladouceur et al.

OTHER PUBLICATIONS

INPI Search Report and Written Opinion for FR 1751502 dated Oct. 11, 2017 (7 pages).
Zortman, William A. et al: "Low-Voltage Differentially-Signaled Modulators," Optics Express, Dec. 19, 2011, XP55413863 (10 pages).
Guoliang Li et al. "Ring resonator Modulators in Silicon for Interchip Photonic Links", IEEE Journal of Selected Topics in Quantum Electronics, vol. 19, No. 6, Nov./Dec. 2013 (19 pages).
Hai, et al., "A Low-voltage PAM-4 SOI Ring-based Modulator" IEEE, 978-1-4577-1504 2014 (2 pages).

*Primary Examiner* — Eric Wong
(74) *Attorney, Agent, or Firm* — Crowe & Dunlevy

(57) ABSTRACT

A Mach-Zehnder ring modulator includes a first optical path having a first diode and a optical path having a second diode. Each of the first and second diodes operates responsive to a voltage signal by modifying a phase of a light signal. A first optical coupler provides first and second light signals to the first and second optical paths, respectively. A second optical coupler couples outputs from the first and second optical paths. A feedback path is coupled between an output of the second optical coupler and an input of the first optical coupler.

27 Claims, 5 Drawing Sheets

MACH-ZEHNDER (MZ) RING OPTICAL MODULATOR

PRIORITY CLAIM

This application claims the priority benefit of French Application for Patent No. 1751502, filed on Feb. 24, 2017, the disclosure of which is hereby incorporated by reference in their entirety to the maximum extent allowable by law.

TECHNICAL FIELD

The present disclosure relates to the field of optical modulators, and in particular to the field of Mach-Zehnder modulators (MZM).

BACKGROUND

A Mach-Zehnder modulator (MZM), also known as a Mach-Zehnder interferometer (MZI), is an optical modulator based on interference between two out-of-phase optical signals combined by an optical coupler. In particular, the optical power in each output branch of the optical coupler will depend on the amount of phase difference between the optical signals at the inputs of the coupler.

In order to provide a variable phase difference between the optical signals, it has been proposed to propagate the optical signals through diodes across which a biasing voltage is applied, the phase shift of each optical signal being a function of the applied voltage level. In this way, a voltage signal applied to the diodes can be used to generate a modulated optical signal.

The successful demodulation of the optical signal at the receiver will depend on the extinction ratio of the optical signal, in other words the difference in the light intensity between different levels of the optical signal. In existing MZMs, in order to provide a phase difference between the optical signals that is sufficiently high to achieve a good extinction ratio, it is generally necessary to provide relatively long diodes, for example of between 2 and 3 mm in length. However, the use of relatively long diodes has drawbacks in terms of surface area and energy consumption. Furthermore, while it has been proposed to implement a ring modulator having a feedback path in order to increase the extinction ratio to some extent, it would be desirable to increase the extinction ratio further and/or reduce the energy consumption of such a modulator.

There is thus a need in the art for an optical modulator permitting diodes of reduced length to be used while maintaining a relatively high extinction ratio of the resulting optical signal.

SUMMARY

According to one aspect, there is provided a Mach-Zehnder (MZ) ring modulator comprising: a first optical path comprising a first diode adapted to receive a first voltage signal for modifying a phase of a first light signal transmitted through the first optical path; a second optical path comprising a second diode adapted to receive the first voltage signal for modifying a phase of a second light signal propagated in the second optical path, wherein the first voltage signal varies between a reverse biasing voltage level and a forward biasing voltage level; a first optical coupler configured to provide the first and second light signals to the first and second optical paths; a second optical coupler configured to couple the first and second optical paths; and a feedback path coupled between an output of the second optical coupler and an input of the first optical coupler.

According to one embodiment, the MZ ring modulator further comprises a drive circuit adapted to generate the first voltage signal, wherein the drive circuit is adapted to generate the forward biasing voltage level to be higher than 0 V and lower than 150 percent of a threshold voltage of the first and second diodes.

According to one embodiment, the drive circuit is adapted to generate the first voltage signal to have negative and/or positive overshoot.

According to one embodiment, the drive circuit is adapted to generate the overshoot to occur directly following a transition of the first voltage signal from the reverse biasing voltage level to the forward biasing voltage level, and has a duration of between 5 and 75 percent of the duration of the forward biasing voltage pulse.

According to one embodiment, the drive circuit is adapted to generate the first voltage signal to have both positive and negative overshoot.

According to one embodiment, the first optical path comprises a first further diode configured to introduce a phase shift of between 10° and 90° to the first light signal.

According to one embodiment, the MZ ring modulator further comprises a control circuit configured to supply a biasing voltage to the first further diode based on a first output signal of the second optical coupler.

According to one embodiment, the second optical path comprises a second further diode configured to introduce a phase shift of between 10° and 90° to the second light signal, and the control circuit is configured to supply a biasing voltage to the first further diode based on a second output signal of the second optical coupler.

According to one embodiment, each of the first and second diodes has a length of between 50 and 1000 μm.

According to one embodiment, the feedback path comprises one or more waveguides and/or diodes having a combined length of no more than twice the length of each of the first and second diodes.

According to a further aspect, there is provided an optical link comprising: the above MZ ring modulator; and an optical channel coupled to an output of the second optical coupler.

According to a further aspect, there is provided a method of optical modulation comprising: providing a Mach-Zehnder ring modulator having a first optical path comprising a first diode, a second optical path comprising a second diode, a first optical coupler configured to provide first and second light signals to the first and second optical paths, a second optical coupler configured to couple the first and second optical paths, and a feedback path coupled between an output of the second optical coupler and an input of the first optical coupler; and applying to the first and second diodes a first voltage signal, the first voltage signal varying between a reverse biasing voltage level and a forward biasing voltage level.

BRIEF DESCRIPTION OF THE DRAWINGS

The foregoing and other features and advantages will become apparent from the following detailed description of embodiments, given by way of illustration and not limitation with reference to the accompanying drawings, in which.

DETAILED DESCRIPTION

The term "around" is used herein to designate a range of plus or minus 10 percent of the value in question.

Figure 1:
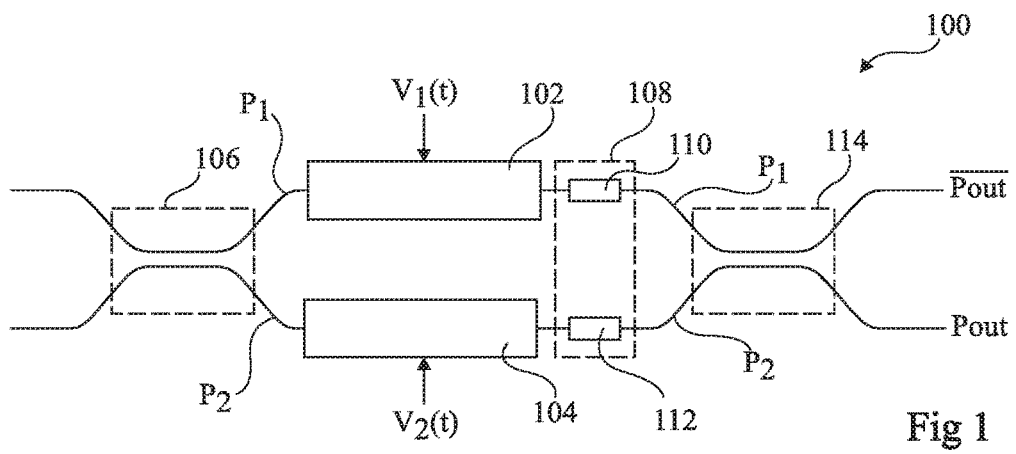
FIG. 1 schematically illustrates a Mach-Zehnder modulator (MZM) according to an example embodiment.

FIG. 1 schematically illustrates an Mach-Zehnder modulator (MZM) 100 according to an embodiment that has been proposed. The MZM 100 comprises an optical path $P_1$ having a diode 102, and an optical path $P_2$ having a diode 104. The diodes 102, 104 are respectively biased by voltage signals $V_1(t)$ and $V_2(t)$. The diodes 102, 104 are used to introduce a varying phase difference between the light signals in the optical paths $P_1$, $P_2$, and such diodes will be referred to herein as MZ (Mach-Zehnder) diodes. A light source signal is provided to the MZ diodes 102 and 104 via an optical coupler 106, which provides light signals to the optical paths $P_1$, $P_2$ having a phase difference of $\pi/2$ radians. A phase modification device 108 is coupled to the outputs of the MZ diodes 102 and 104, and creates a default phase shift of $\pi/2$ radians between the optical paths in the absence of any phase difference applied by the MZ diodes 102, 104. For example, the optical device 108 comprises diodes 110, 112 respectively configured to introduce phase shifts of $+\pi/4$ and $-\pi/4$. An optical coupler 114 couples the optical signals of the optical paths $P_1$, $P_2$ at the outputs of the diodes 110 and 112 in order to generate output optical signals Pout and $\overline{\text{Pout}}$, one of which provides the modulated output signal of the MZM 100 that can be transmitted over an optical link (not illustrated in FIG. 1) to a receiver.

Figure 2:
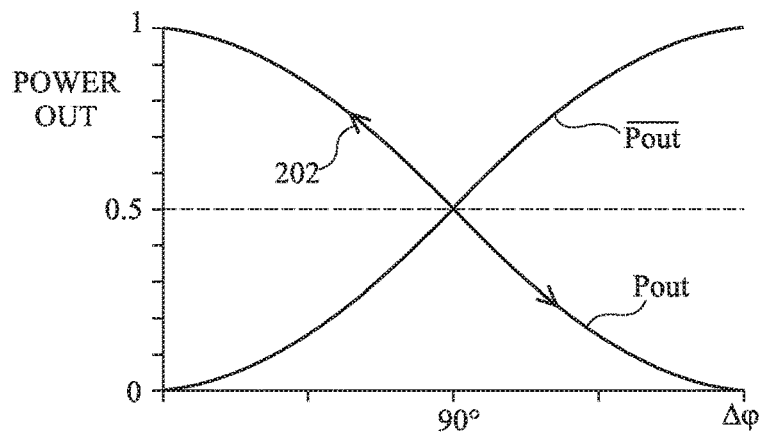
FIG. 2 is a graph representing the output transmission power of each output branch of the MZM of FIG. 1 as a function of the phase shift according to an example embodiment.

FIG. 2 is a graph representing the power of the output optical signals Pout and $\overline{\text{Pout}}$ of the MZM 100 of FIG. 1 as a function of the phase difference between the optical signals introduced by the optical paths $P_1$, $P_2$. As illustrated, when the voltage signals $V_1(t)$, $V_2(t)$ are not applied, the default phase difference between the optical signals introduced by the optical paths is approximately $\pi/2$ radians, in other words approximately 90°. At this phase difference, the output power is split substantially equally between the output signals Pout and $\overline{\text{Pout}}$. As represented by an arrow 202 in FIG. 2, as the phase difference becomes lower than $\pi/2$ radians, the power of the optical output signal Pout increases towards a value of 1 representing the full power of the combined optical signals Pout, $\overline{\text{Pout}}$, and as the phase difference becomes higher than $\pi/2$ radians, the power of the optical signal Pout decreases towards a value of 0.

The relation between the output power Pout and the phase difference $\Delta\varphi$ between the optical signals introduced by the optical paths $P_1$, $P_2$ corresponds to Pout~$\cos^2(k\Delta\varphi)$, where k is an integer indicating modulo $2\pi$. The phase shift $\Delta\varphi'$ introduced by each of the MZ diodes 102, 104 can be determined by the following expression:

$$\Delta\varphi' = \frac{2 \cdot \pi}{\lambda_0} \cdot \Delta n \cdot l$$

where $\lambda_0$ is the wavelength of the optical signal, $\Delta n$ is the change in the refractive index of the material of the diode brought about by the voltage change, and l is the length of the diode.

Figure 3:
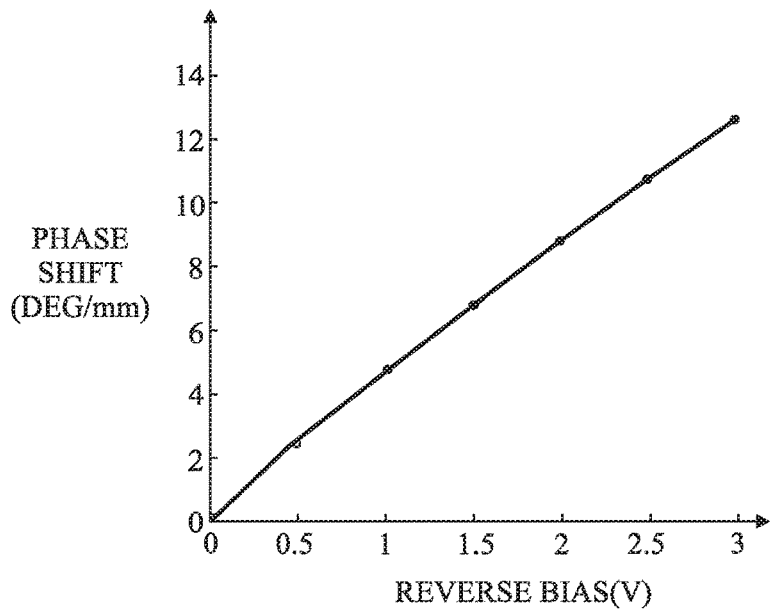
FIG. 3 is a graph illustrating an example of a phase shift applied to an optical signal by a Mach-Zehnder (MZ) diode as a function of the reverse voltage according to an example embodiment.

FIG. 3 is a graph illustrating an example of the relationship between a reverse biasing voltage (REVERSE BIAS) applied to an MZ diode, and the resulting phase shift (PHASE SHIFT) in degrees per millimeter, of the optical signal passing through the diode. For example, a reverse biasing voltage of approximately 2 V results in a phase shift of approximately 9 degrees. Therefore, in order to achieve a phase difference $\Delta\varphi$ of +/-30° between the optical signals in the optical paths $P_1$, $P_2$ of the modulator, the MZ diodes 102, 104 in the embodiment of FIG. 1 each have lengths of approximately 3 mm.

In order to improve the extinction ratio of the modulated light signal, it has been proposed to provide an MZM having a feedback path, as will now be described in more detail with reference to FIG. 4.

Figure 4:
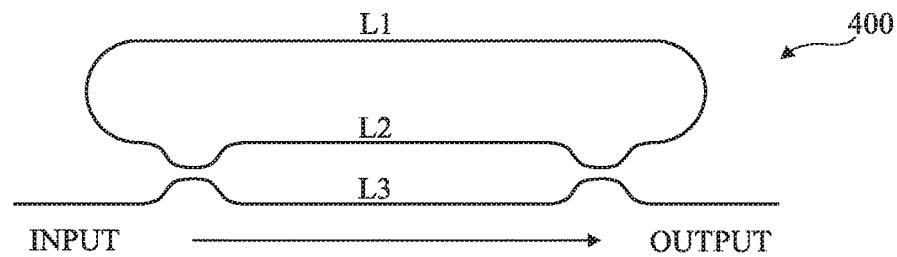
FIG. 4 schematically illustrates an MZI-coupled ring modulator according to an embodiment that has been proposed.

FIG. 4 schematically illustrates an MZI-coupled ring modulator 400, and substantially reproduces FIG. 7 of the publication by Guoliang Li et al. entitled "Ring resonator Modulators in Silicon for Interchip Photonic Links", IEEE Journal of Selected Topics in Quantum Electronics, Vol. 19, no. 6, November/December 2013, the disclosure of which is hereby incorporated by reference to the extent permitted by the law.

The modulator 400 comprises an input optical coupler receiving, at one of its inputs, an input optical signal (INPUT), and an output optical coupler providing, at one of its outputs, an output optical signal (OUTPUT). The input and output optical couplers are coupled together by a pair of waveguides L2, L3 forming arms of an MZI. A feedback path comprising a further waveguide L1 couples a further output of the output optical coupler to a further input of the input optical coupler. The ring resonance of the ring modulator is tuned to the wavelength of the laser light applied to the modulator. An on-state, during which the output signal is high, is achieved when the two MZI arms are out-of-phase, so that the effective ring-bus coupling is near zero. An off-state can be achieved when the effective ring-bus coupling is close to the critical coupling.

While the ring coupler of FIG. 4 may be capable of providing a higher extinction ratio when compared to the MZM of FIG. 1, it would be desirable to further increase the extinction ratio and/or reduce consumption.

Figure 5:
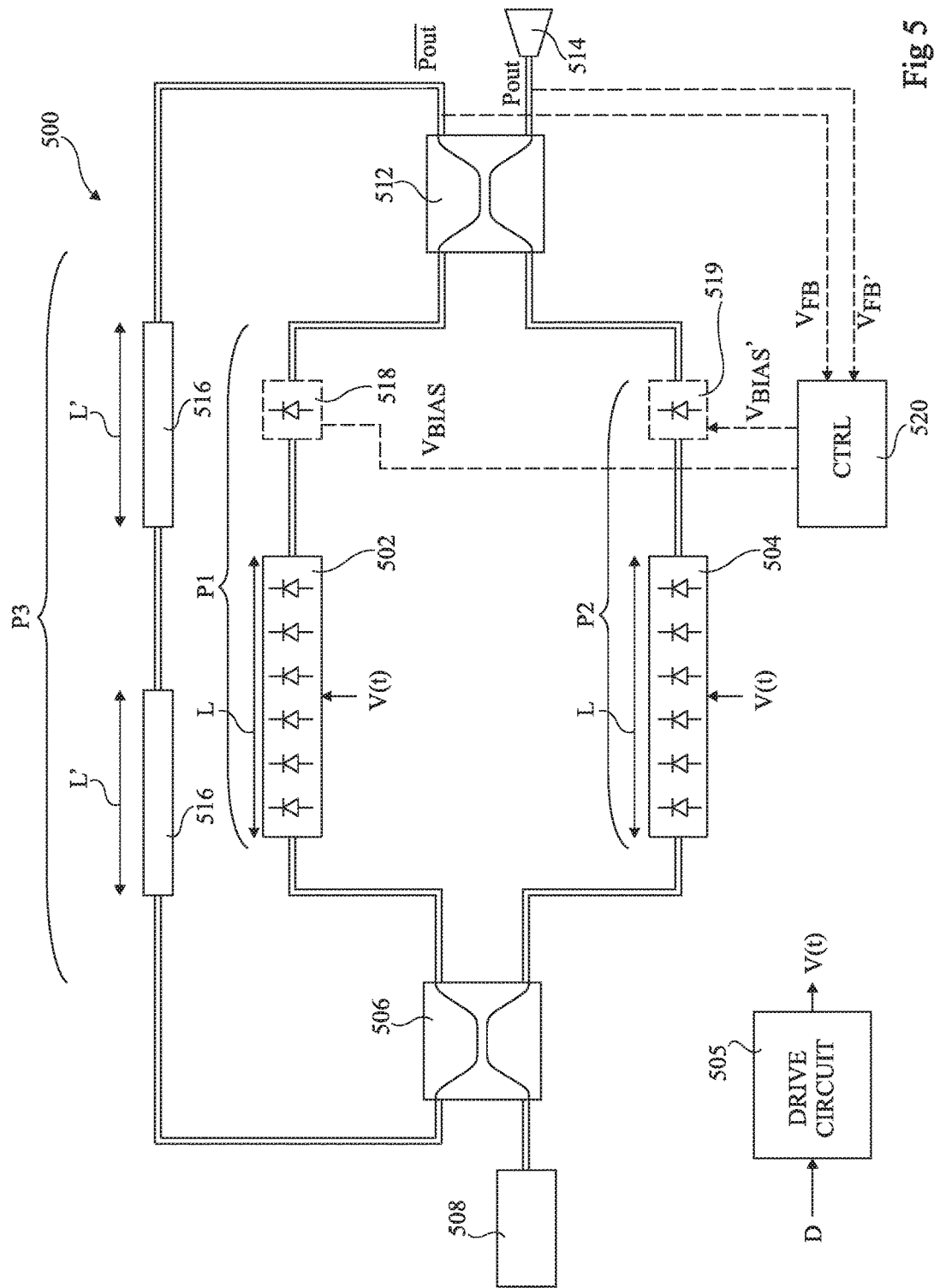
FIG. 5 schematically illustrates an MZ ring modulator according to an example embodiment of the present disclosure.

FIG. 5 schematically illustrates an MZ ring modulator 500 according to an example embodiment of the present disclosure. The modulator 500 comprises optical paths P1, P2 and P3. The paths P1 and P2 comprise diodes 502, 504 respectively, each controlled by a biasing voltage signal V(t), these diodes being referred to herein as MZ diodes. The MZ diodes are diodes known in the art as HSPM (high speed phase modulation) diodes, which allow the phase of the optical signal to be modified relatively quickly. As represented in FIG. 5, each of the MZ diodes 502, 504 may be implemented by the parallel electrical connection of several diodes, each driven by the voltage signal V(t). The diodes forming each MZ diode 502, 504 are arranged along the corresponding optical path P1, P2, such that the optical signals pass through each diode. Each of the MZ diodes 502, 504, for example, has a length L along its optical path of between 50 and 1000 μm.

The voltage signal V(t) is generated by a drive circuit 505 based on a data signal D to be modulated by the optical modulator.

The optical paths P1, P2 are supplied by an optical coupler 506, which has two inputs, one of which receives an optical signal from a laser source 508, and the other of which is coupled to the path P3, which is a feedback path.

The outputs of the MZ diodes 502, 504 are coupled to an optical coupler 512, which provides modulated output signals Pout and $\overline{Pout}$. The output signal Pout is transmitted to an optical receiver (not illustrated) via an output element 514. The output signal $\overline{Pout}$ is provided to the feedback path P3, which comprises one or more waveguides 516. In the example of FIG. 5, there are two waveguides 516 coupled in series in the feedback path P3. The total length of the waveguides does not, for example, exceed twice the length of each MZ diode 502, 504. For example, the length L' of each of the waveguides 516 is less than the length L of each MZ diode 502, 504. Generally, the shorter the length of the feedback path, the better the response. Furthermore, the feedback path introduces a phase shift of under 60°. While not illustrated in FIG. 5, in alternative embodiments, the waveguides 516 could be replaced by other types of optical device, such as PINPM (P-intrinsic-N phase modulation) diodes.

In some embodiments, either or both of the optical paths P1, P2 further comprises a further diode. In particular, the path P1 comprises a diode 518 positioned between the MZ diode 502 and the optical coupler 512 and/or the path P2 comprises a diode 519 positioned between the MZ diode 504 and the optical coupler 512. The diodes 518, 519 are, for example, PINPM diodes, having a slower response time than an HSPM diode. The diodes 518, 519 introduce a phase shift of between 10° and 90° to the optical signal in the corresponding optical path P1, P2, and, for example, of around 45°. When the diode 518 is provided alone, it creates a dissymmetry between the optical paths P1, P2. The use of the two diodes 518 and 519 permits a specific calibration of the device in order to modify the power level of the feedback light signal.

While in the embodiment of FIG. 5 the diodes 518, 519 are respectively positioned between the MZ diodes 502, 504 and the optical coupler 512, in alternative embodiments either or both could be positioned elsewhere in the corresponding optical path P1, P2, for example between the optical coupler 506 and the MZ diode 502, 504 respectively. In some embodiments, an optical coupler (not illustrated) is adapted to divert a small percentage of the power of the optical signal $\overline{Pout}$ to an optical receiver (also not illustrated), which converts this signal into a voltage to provide a feedback signal $V_{FB}$. This feedback signal is provided to a control circuit (CTRL) 520, which is adapted to adjust a biasing voltage $V_{BIAS}$ of the diode 518 based on this feedback signal.

Additionally or alternatively, an optical coupler (not illustrated) is adapted to divert a small percentage of the power of the optical signal Pout to an optical receiver (also not illustrated), which converts this signal into a voltage to provide a feedback signal $V_{FB}'$. This feedback signal is provided to the control circuit 520, which is adapted to adjust a biasing voltage $V_{BIAS}'$ of the diode 519 based on this feedback signal. In the case that the control circuit 520 receives both of the feedbacks signals $V_{FB}$ and $V_{FB}'$, and generates the two biasing voltages $V_{BIAS}$ and $V_{BIAS}'$, this permits a specific calibration of the device in order to modify the feedback light power level. In particular, this provides a degree of liberty for adjusting the power level, allowing correction of temperature effects and/or path mismatch.

Operation of the MZ ring modulator 500 of FIG. 5 will now be described in more detail with reference to FIG. 6.

Figure 6:
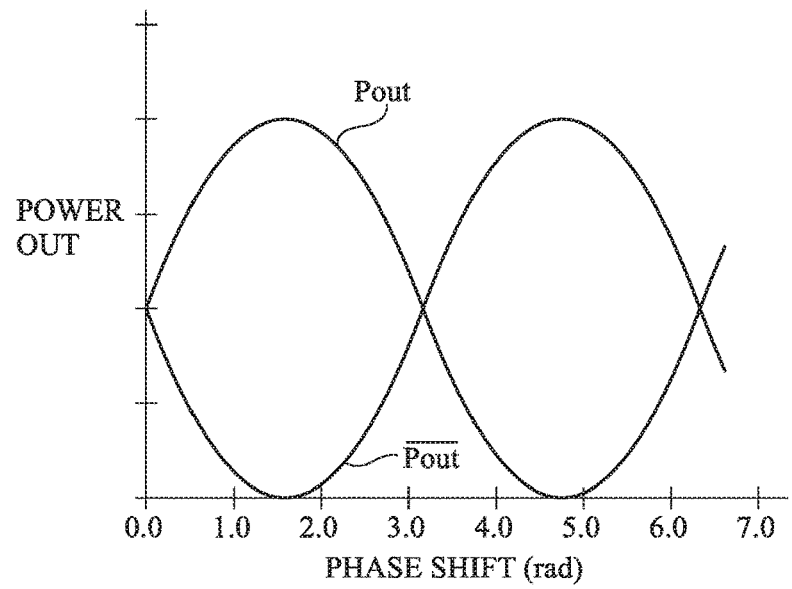
FIG. 6 is a graph representing the output power of an optical signal as a function of phase shift in the MZ ring modulator of FIG. 5.

FIG. 6 is a graph representing the power of the output signals Pout and $\overline{Pout}$ of the optical coupler 512 as a function of the phase shift between the optical signals at the inputs of the optical coupler according to an example embodiment. The combined power of these signals is substantially equal to the input power provided by the laser source 508. In the absence of a phase difference between the signals in the paths P1 and P2, or when the phase difference is equal to 180°, the power is equally split between the output signals Pout and $\overline{Pout}$. When there is a phase shift of π/2 radians, in other words 90°, substantially all of the power is provided in the signal Pout. When there is a phase shift of 3π/2 radians, in other words 270°, substantially all of the power is provided in the signal $\overline{Pout}$.

On the one hand, in the example embodiment, when the MZ diodes 502, 504 are forward biased such that the MZ output signal Pout is to be low, the phase at the output paths P1, P2 including the couplers 506 and 512 and the phase shift introduced in the path P3 are chosen to cause a higher proportion of the output signal to be provided to the signal $\overline{Pout}$. On the other hand, when the MZ diodes 502, 504 are reverse biased, such that the MZ output signal Pout is to be high, the phases are chosen to cause substantially equal amounts of output power in the signals Pout and $\overline{Pout}$.

Figure 7A:
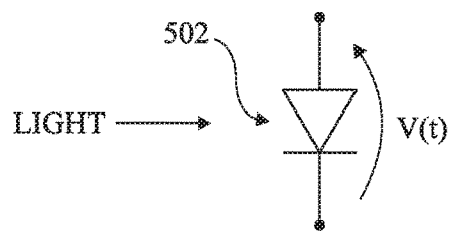
FIG. 7A schematically illustrates an MZ diode according to an example embodiment.

FIG. 7A schematically illustrates the MZ diode 502 of FIG. 5 according to an example embodiment. The voltage signal V(t) is applied across the diode between the cathode and anode. The MZ diode 504 is biased in the same manner as the MZ diode 502.

In some embodiments, the voltage signal V(t) applied to the MZ diodes 502, 504 varies between negative and positive voltage levels, such that these diodes are forward and reverse biased. If the diode is reverse biased, in other words the voltage signal V(t) applied across diode is negative, there will be a carrier depletion in the diode, leading to an increased phase delay. If the diode is forward biased, in other words the voltage signal V(t) applied across diode is positive, there will be carrier injection in the diode, leading to higher absorption and thus allowing a low value at the output. This will now be described in more detail with reference to FIG. 7B.

Figure 7B:
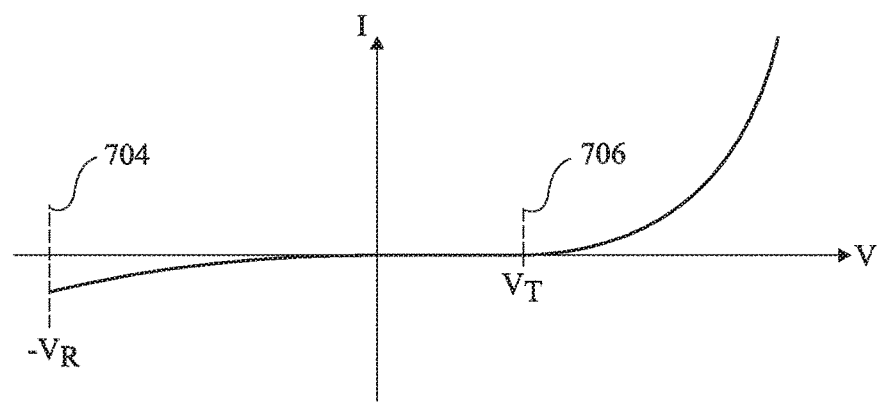
FIG. 7B is a graph illustrating current flow in an MZ diode as a function of the applied voltage according to an example embodiment.

FIG. 7B is a graph illustrating the current I through each of the MZ diodes 502, 504 as a function of voltage. The voltage signal V(t) varies between a reverse biasing voltage 704 equal to $-V_R$ and a forward biasing voltage 706 equal to $V_T$, where $V_T$ is the threshold voltage of the MZ diode, equal, for example, to between 0.5 and 1 V. Rather than the forward biasing voltage 706 being at $V_T$, it could be at a level of between 80% and 150% of $V_T$, for example approximately 90% of $V_T$. The reverse biasing voltage $-V_R$ is equal, for example, to between −1 and −3 V, and for example approximately −1.8 V.

FIGS. 8A to 8F are timing diagrams representing an example of the operation of the modulator of FIG. 5 in the case that the diodes 518 and 519 are not present.

Figure 8A:
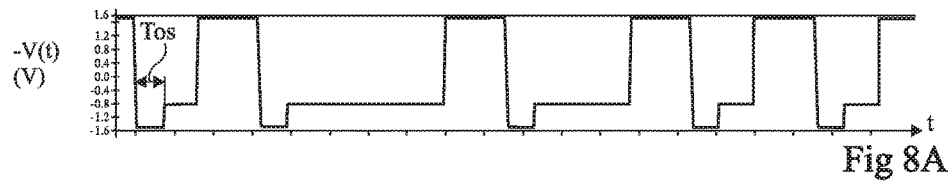
FIGS. 8A to 8F are timing diagrams representing signals in the MZ ring modulator of FIG. 5 according to an example embodiment of the present disclosure.

FIG. 8A illustrates an example of the inverse −V(t) of the voltage signal V(t) applied to the MZ diodes 502, 504. In particular, positive voltages in FIG. 8A correspond to reverse biasing voltages, and negative voltages in FIG. 8A correspond to forward biasing voltages. The voltage signal −V(t) transitions between a reverse biasing level of 1.7 V and a forward biasing level of −0.8 V. FIG. 8A assumes that an NRZ (non-return to zero) modulation scheme is used, and the signal is switched between the forward biasing level to transmit a "0" bit, and the reverse biasing level to transmit a "1" bit. Furthermore, directly following each transition of the voltage from the reverse biasing level to the forward biasing level, a forward bias overshoot is applied for a duration Tos. This overshoot is for example of between 0.1 and 0.8 V, and for example of around 0.5 V. The duration Tos is for example of between 5% and 75% of the duration of the corresponding forward biasing pulse of the signal V(t).

Figure 8B:
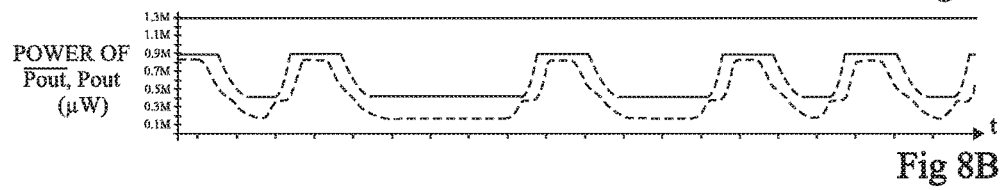
Figure 8C:
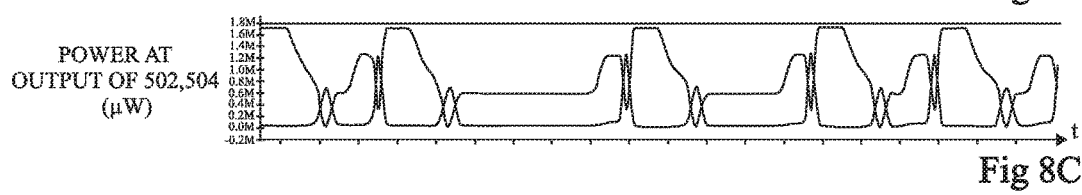
Figure 8D:
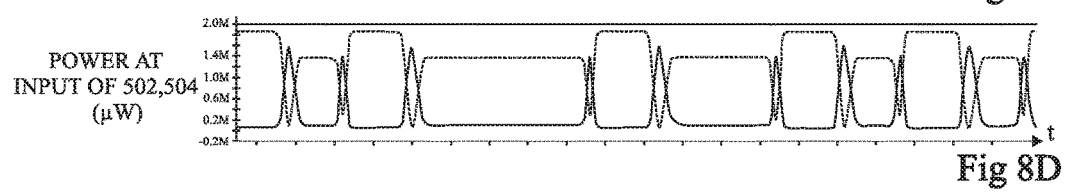

FIG. 8B represents the optical power on the feedback path P3 just after the coupler 512 and the optical power Pout available from the MZ modulator 500. FIG. 8C represents the optical output power of the MZ modulator 500 just before the optical coupler 512, in other words at the outputs of the MZ diodes 502, 504, and FIG. 8D represents the optical power in the paths P1 and P2 just after the optical coupler 506, in other words at the inputs of the MZ diodes 502, 504. It can be seen that the optical power in both the output path and the feedback path is modulated by the biasing voltages applied to the diodes 502, 504, the power being high when the voltage signal V(t) is at the reverse biasing level and low when the voltage signal V(t) is at the forward biasing level. Indeed, the forward biasing state causes increased absorption.

Figure 8E:
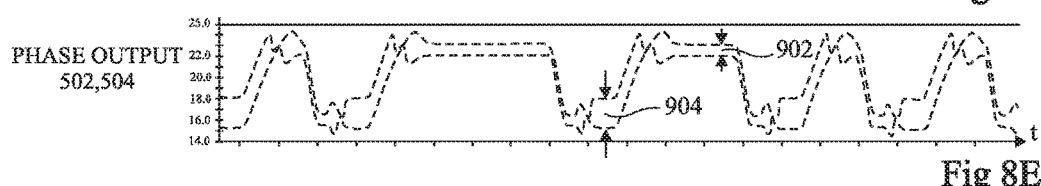
Figure 8F:
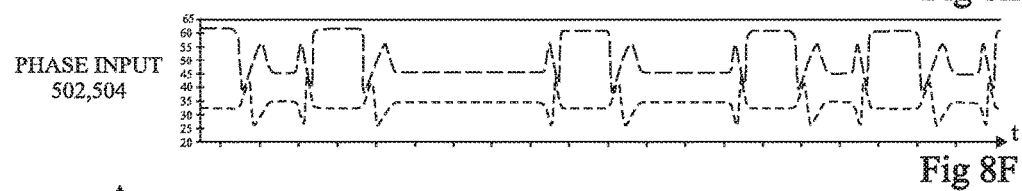

FIG. 8E represents the phase of the optical signals in the paths P1, P2 before the optical coupler 512, in other words at the outputs of the MZ diodes 502, 504, and FIG. 8F represents the phase of the optical signals after the optical coupler 506, in other words at the inputs of the MZ diodes 502, 504. The phase variation of each of the signals in the paths P1, P2 varies with the signal V(t), particularly in forward bias. However, most of the phase difference before the output coupler 512 depends on the phase shift introduced by the feedback device 516 and the input coupler 506. As illustrated in FIG. 8E, the input signals of the optical coupler 512 have a phase difference 902 of around 60° (−1 radian) when the MZ diodes 502, 504 are forward biased, allowing optical power to be returned via the feedback path, or a phase difference 904 of around 180° (−3 radians) when the MZ diodes 502, 504 are reverse biased, allowing the amount of power to be divided more or less by two.

Figure 9A:
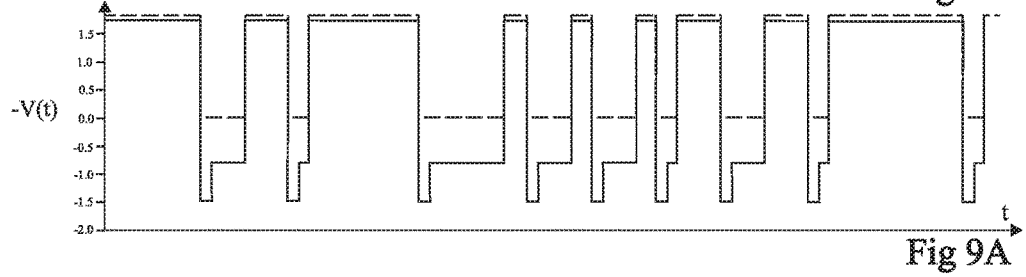
FIGS. 9A and 9B are timing diagrams representing examples of modulating voltages and output voltages in a standard MZ ring modulator and in the MZ ring modulator of FIG. 5.
Figure 9B:
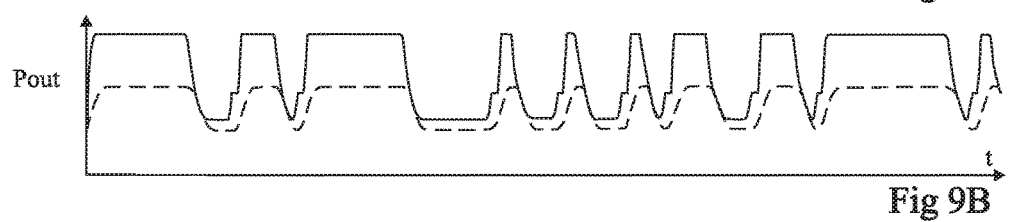

FIGS. 9A and 9B are timing diagrams illustrating the advantage of applying, in the modulator of FIG. 5, a signal V(t) resulting in both reverse and forward biasing of the MZ diodes 502, 504. FIG. 9A illustrates the voltage signal −V(t), and FIG. 9B illustrates the resulting power of the output optical signal Pout. A dashed line in FIGS. 9A and 9B illustrates an example in which only reverse biasing is applied, with no overshoot. A solid line in FIGS. 9A and 9B illustrates an example in which reverse and forward biasing with overshoot is applied. It can be seen that the amplitude variation between the output levels of the signal Pout can be more than doubled by using forward biasing and overshoot, for a relatively small increase power consumption.

Figure 10A:
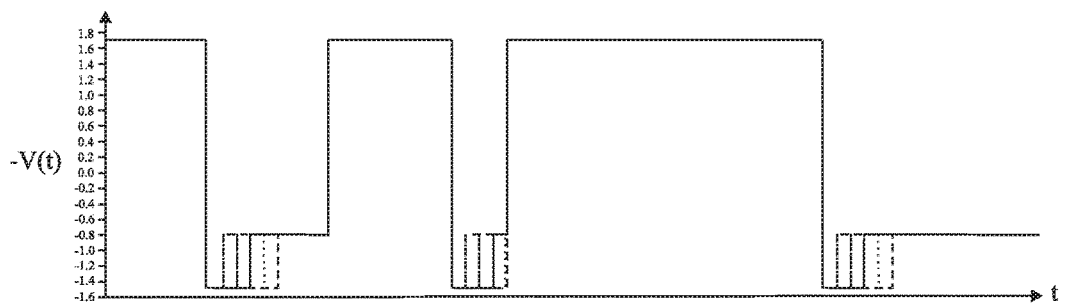
FIGS. 10A and 10B are timing diagrams representing examples of modulating voltages having varying durations of overshoot and corresponding output voltages in the MZ ring modulator of FIG. 5.
Figure 10B:
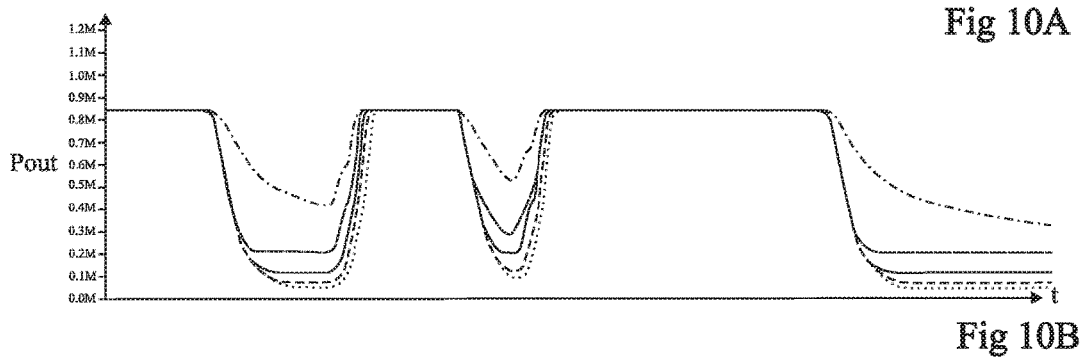

FIGS. 10A and 10B are timing diagrams illustrating the effect of varying the duration Tos of overshoot. FIG. 10A illustrates an example of the signal −V(t) applied to the MZ diodes 502, 504 in which the overshoot has a duration of 5, 10, 15, 20 and 25 ps. FIG. 10B illustrates the resulting effect on the output optical signal Pout. As the overshoot duration increases, the output signal Pout has a significantly higher amplitudes.

Figure 11A:
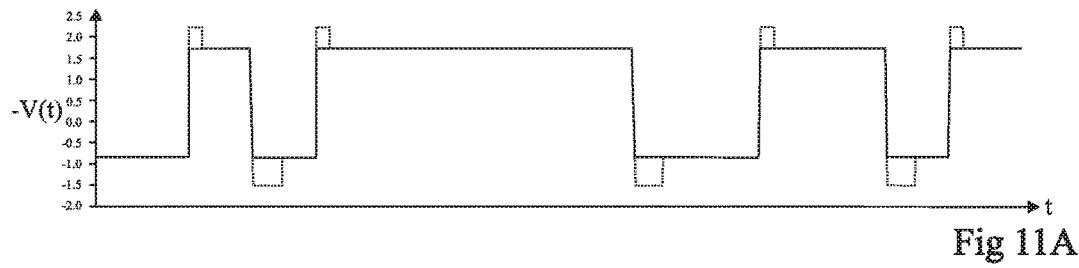
FIGS. 11A and 11B are timing diagrams representing examples of a modulating voltage without overshoot and having positive and negative overshoot, and the corresponding output voltages, in the MZ ring modulator of FIG. 5.
Figure 11B:
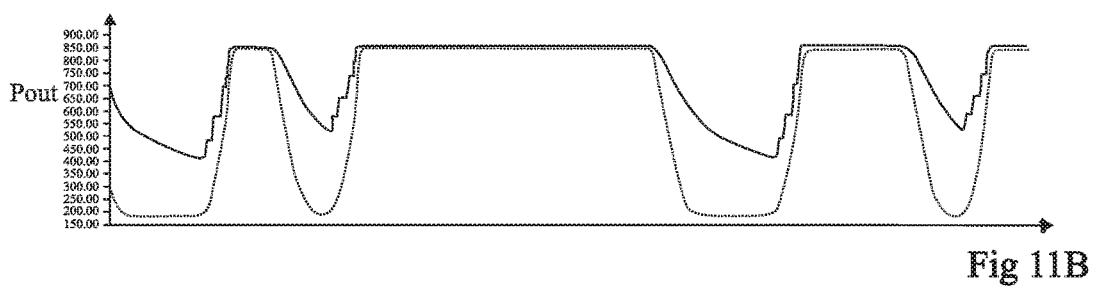

FIGS. 11A and 11B are timing diagrams illustrating the advantage of applying overshoot to the voltage signal −V(t). In the example of FIG. 11A, a solid line illustrates a case in which the voltage signal −V(t) has no overshoot, and a dashed line illustrates a case in the voltage signal −V(t) has both negative and positive overshoot of around 0.5 V. The negative overshoot of the forward biasing level has a duration Tos of around 20 ps and the positive overshoot of the reverse biasing level has a duration of around 10 ps. More generally, the duration Tos could be anywhere between a few ps and several tens of ps. The choice of the duration Tos depends on the data rate, and on the diode parameters. As demonstrated by FIG. 11B, the amplitude of the output optical signal Pout is significantly increased when overshoot is applied.

The present inventors have found that the MZ ring modulator of FIG. 5 is capable of providing a relatively high extinction ratio, despite the relatively short length of the MZ diodes 502, 504. For example, providing the MZ diodes 502, 504 each having a length of approximately 300 µm, and using reverse and forward biasing, it has been found that an extinction ratio of over 6.2 dB can be achieved at a data rate of 25 Gbits/s NRZ, which compares to an extinction ratio of around 5.3 dB for the structure of FIG. 1 assuming that the diodes 110 and 112 are each of 250 µm in length and the HSPM diodes 102, 104 are each 2520 µm in length.

While the embodiment of FIG. 5 has been described in relation with a two-level modulation scheme, in alternative embodiments additional modulation levels can be used, providing PAM 4 modulation or higher, as will now be described with reference to FIG. 12.

Figure 12:
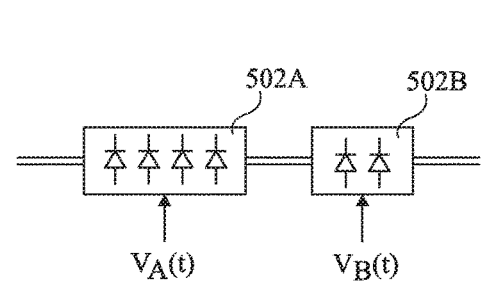
FIG. 12 schematically illustrates an MZ diode of FIG. 5 according to an alternative example embodiment.

FIG. 12 schematically illustrates the MZ diode 502 according to an alternative embodiment allowing PAM 4 modulation to be implemented. In particular, the MZ diode 502 is implemented by an MZ diode 502A controlled by a voltage signal $V_A(t)$ and an MZ diode 502B controlled by a voltage signal $V_B(t)$. The diode 502A is approximately twice the length of the diode 502B. The MZ diode 504 is implemented in a similar fashion and controlled by the same signals. Different modulation levels can thus be achieved by using specific driving signals to drive the diodes 502B and 502A.

While FIG. 12 provides one example of a PAM 4 implementation, other solutions would be possible for controlling the dynamic voltages of the diodes 502, 504. Having thus described at least one illustrative embodiment, various alterations, modifications and improvements will readily occur to those skilled in the art. For example, while a particular example of an MZ modulator is described in relation with FIG. 5, it will be apparent to those skilled in the art that various modifications could be applied to this circuit, including the addition of further components.

Furthermore, while the example of a PAM 4 modulation scheme has been described in relation to FIG. 12, it will be obvious to those skilled in the art how this could be extended to PAM 8 or PAM 16 modulation schemes.

The invention claimed is:

1. A Mach-Zehnder ring modulator, comprising:
   a first optical path comprising a first diode that operates to modify a phase of a first light signal transmitted through the first optical path in response to a reverse bias applied by a voltage signal and to absorb the first light signal in response to a forward bias applied by the voltage signal;
   a second optical path comprising a second diode that operates to modify a phase of a second light signal propagated in the second optical path in response to the reverse bias applied by the voltage signal and to absorb the second light signal in response to the forward bias applied by the voltage signal;
   a first optical coupler that supplies the first and second light signals to the first and second optical paths;
   a second optical coupler that couples the first and second optical paths; and
   a feedback path coupled between an output of the second optical coupler and an input of the first optical coupler.

2. The MZ ring modulator of claim 1, further comprising a drive circuit that generates the voltage signal for the forward bias with a voltage level that is higher than 0 V and lower than 150 percent of a threshold voltage of the first and second diodes.

3. The MZ ring modulator of claim 2, wherein the drive circuit further generates the voltage signal to have one of a negative overshoot or a positive overshoot.

4. The MZ ring modulator of claim 3, wherein the overshoot occurs directly following a transition of the voltage signal from the voltage level for the reverse bias to the voltage level for the forward bias, and has a duration of between 5 and 75 percent of a duration of a voltage pulse for the forward bias.

5. The MZ ring modulator of claim 3, wherein the drive circuit generates the voltage signal to have both positive and negative overshoot.

6. The MZ ring modulator of claim 1, wherein the first optical path comprises a first further diode that operates to introduce a phase shift of between 10° and 90° to the first light signal in response to a first biasing voltage.

7. The MZ ring modulator of claim 6, further comprising:
   a first circuit that senses power at a first output of the second optical coupler; and
   a control circuit that generates the first biasing voltage to the first further diode based on the sensed power at the first output of the second optical coupler.

8. The MZ ring modulator of claim 7, wherein the second optical path comprises a second further diode that operates to introduce a phase shift of between 10° and 90° to the second light signal in response to a second biasing voltage, and further comprising:
   a second circuit that senses power at a second output of the second optical coupler; and
   wherein the control circuit further generates the second biasing voltage to the second further diode based on the sensed power at the second output of the second optical coupler.

9. The MZ ring modulator of claim 1, wherein each of the first and second diodes has a length of between 50 and 1000 µm.

10. The MZ ring modulator of claim 1, wherein the feedback path comprises at least one waveguide, wherein a combined length of the at least one waveguide is no more than twice the length of each of the first and second diodes.

11. The MZ ring modulator of claim 1, wherein the feedback path comprises a least one diode, wherein a combined length of the at least one diode is no more than twice the length of each of the first and second diodes.

12. A Mach-Zehnder ring modulator, comprising:
    a first optical path comprising a first diode that operates to apply a phase modification to a first light signal transmitted through the first optical path in response to a voltage signal;
    a second optical path comprising a second diode that operates to apply the same phase modification to a second light signal transmitted through the second optical path in response to the voltage signal;
    a first optical coupler that supplies the first and second light signals to the first and second optical paths;
    a second optical coupler that couples the first and second optical paths; and
    a feedback path coupled between an output of the second optical coupler and an input of the first optical coupler.

13. The MZ ring modulator of claim 12, wherein a magnitude of the phase modification is dependent on a reverse bias applied to the first and second diodes by the voltage signal.

14. The MZ ring modulator of claim 13, wherein first and second diodes further operate in response to an applied forward bias by the voltage signal to absorb the first and second light signals, respectively.

15. The MZ ring modulator of claim 14, further comprising a drive circuit that generates the voltage signal for the forward bias with a voltage level that is higher than 0 V and lower than 150 percent of a threshold voltage of the first and second diodes.

16. The MZ ring modulator of claim 12, wherein the first optical path comprises a further diode that operates to introduce a phase shift to the first light signal in response to a biasing voltage.

17. The MZ ring modulator of claim 16, further comprising:
    a circuit that senses power at an output of the second optical coupler; and
    a control circuit that generates the first biasing voltage to the further diode based on the sensed power at the output of the second optical coupler.

18. The MZ ring modulator of claim 12, wherein each of the first and second diodes has a length of between 50 and 1000 µm.

19. The MZ ring modulator of claim 12, wherein the feedback path comprises at least one waveguide, wherein a combined length of the at least one waveguide is no more than twice the length of each of the first and second diodes.

20. The MZ ring modulator of claim 12, wherein the feedback path comprises a least one diode, wherein a combined length of the at least one diode is no more than twice the length of each of the first and second diodes.

21. A Mach-Zehnder ring modulator, comprising:

a first optical path comprising a first diode that operates to modify a phase of a first light signal transmitted through the first optical path in response to a voltage signal;

a second optical path comprising a second diode that operates to modify a phase of a second light signal transmitted through the second optical path in response to the voltage signal;

a first optical coupler that supplies the first and second light signals to the first and second optical paths;

a second optical coupler that couples the first and second optical paths;

a further diode in the first optical path that operates to introduce a phase shift to the first light signal in response to a biasing voltage;

a circuit that senses power at an output of the second optical coupler;

a control circuit that generates the biasing voltage applied to the further diode based on the sensed power at the output of the second optical coupler; and a feedback path coupled between an output of the second optical coupler and an input of the first optical coupler.

22. The MZ ring modulator of claim 21, wherein a magnitude of the modification of phase is dependent on a reverse bias applied to the first and second diodes by the voltage signal.

23. The MZ ring modulator of claim 22, wherein first and second diodes further operate in response to an applied forward bias by the voltage signal to absorb the first and second light signals, respectively.

24. The MZ ring modulator of claim 23, further comprising a drive circuit that generates the voltage signal for the forward bias with a voltage level that is higher than 0 V and lower than 150 percent of a threshold voltage of the first and second diodes.

25. The MZ ring modulator of claim 21, wherein each of the first and second diodes has a length of between 50 and 1000 μm.

26. The MZ ring modulator of claim 21, wherein the feedback path comprises at least one waveguide, wherein a combined length of the at least one waveguide is no more than twice the length of each of the first and second diodes.

27. The MZ ring modulator of claim 21, wherein the feedback path comprises a least one diode, wherein a combined length of the at least one diode is no more than twice the length of each of the first and second diodes.

* * * * *